Dec. 11, 1945.  K. W. COUSE  2,390,513
POWER TAKE-OFF STRUCTURE
Filed March 28, 1944  7 Sheets—Sheet 4
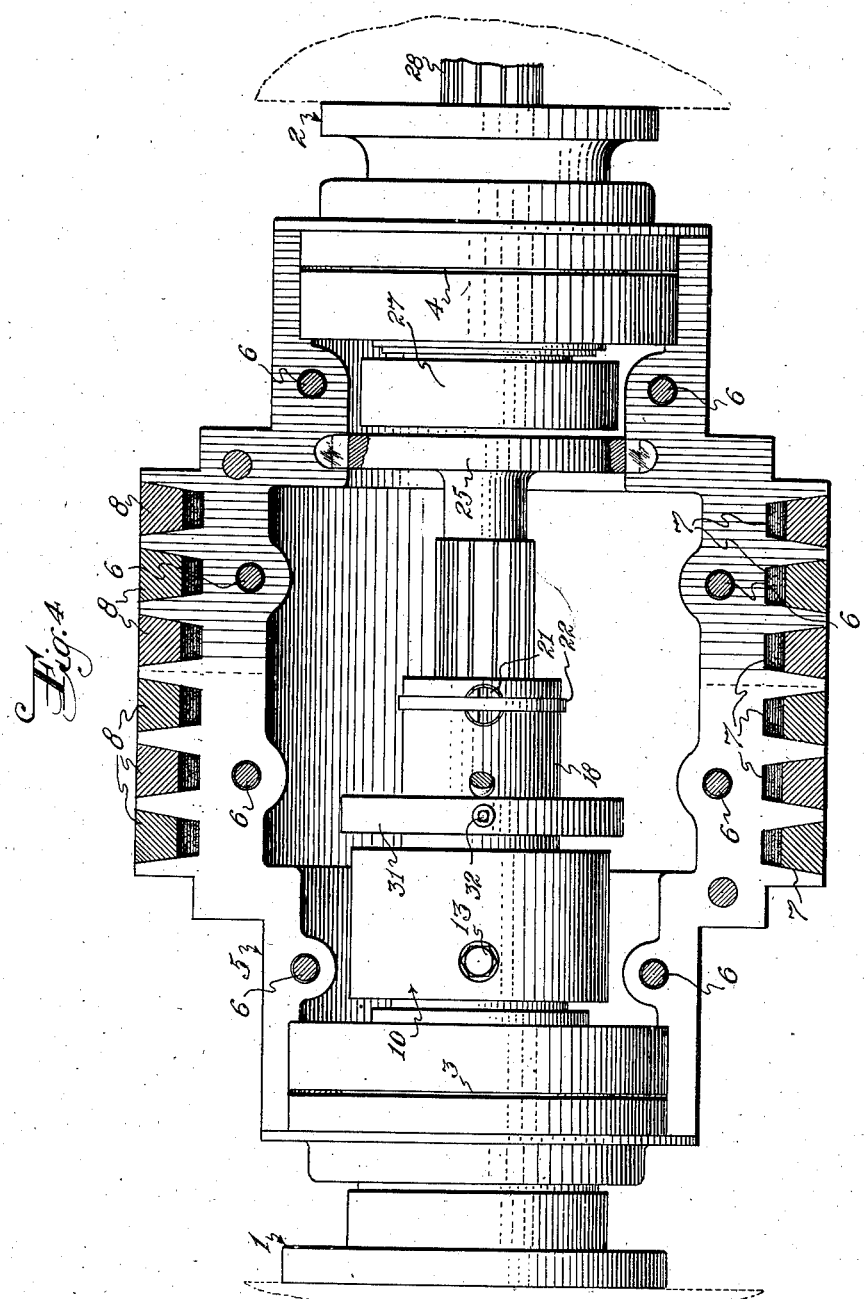

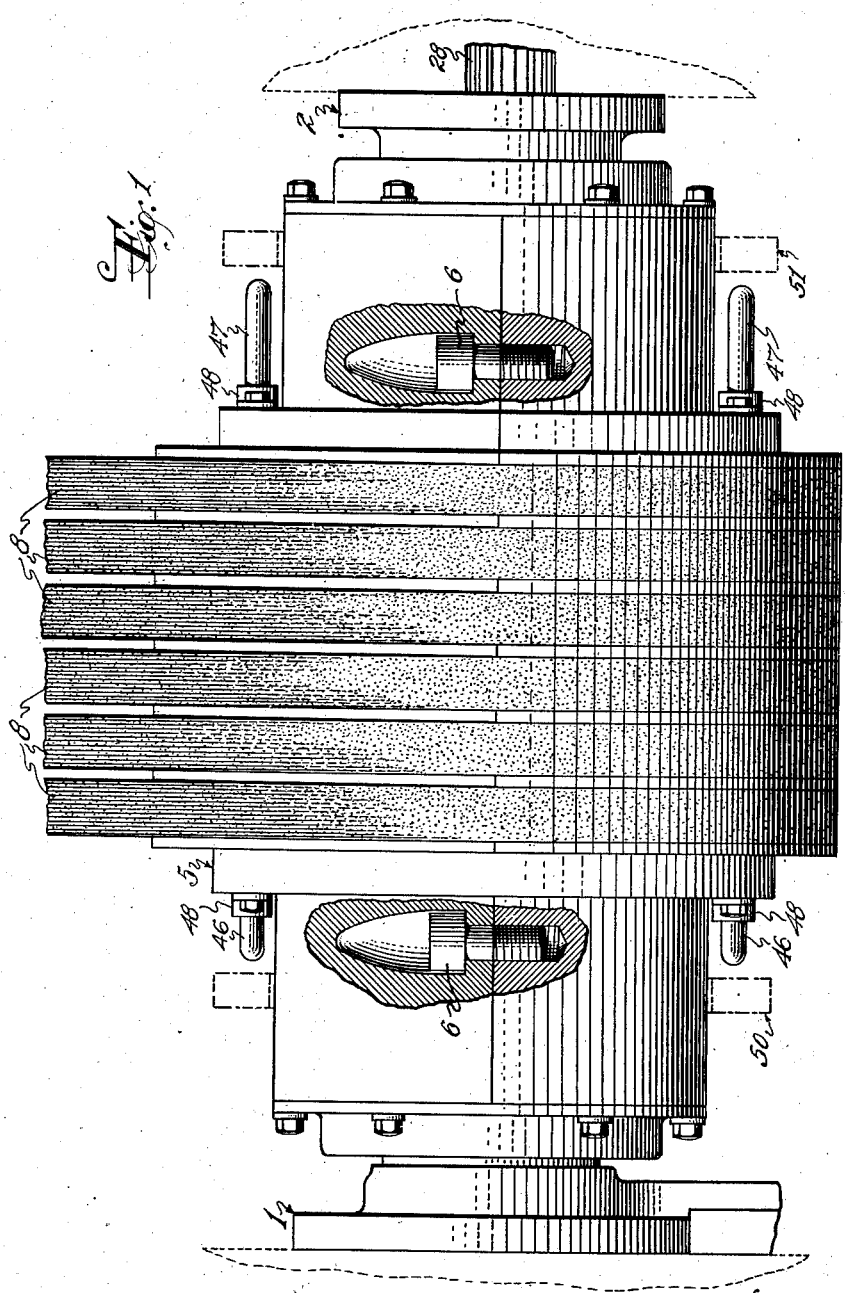

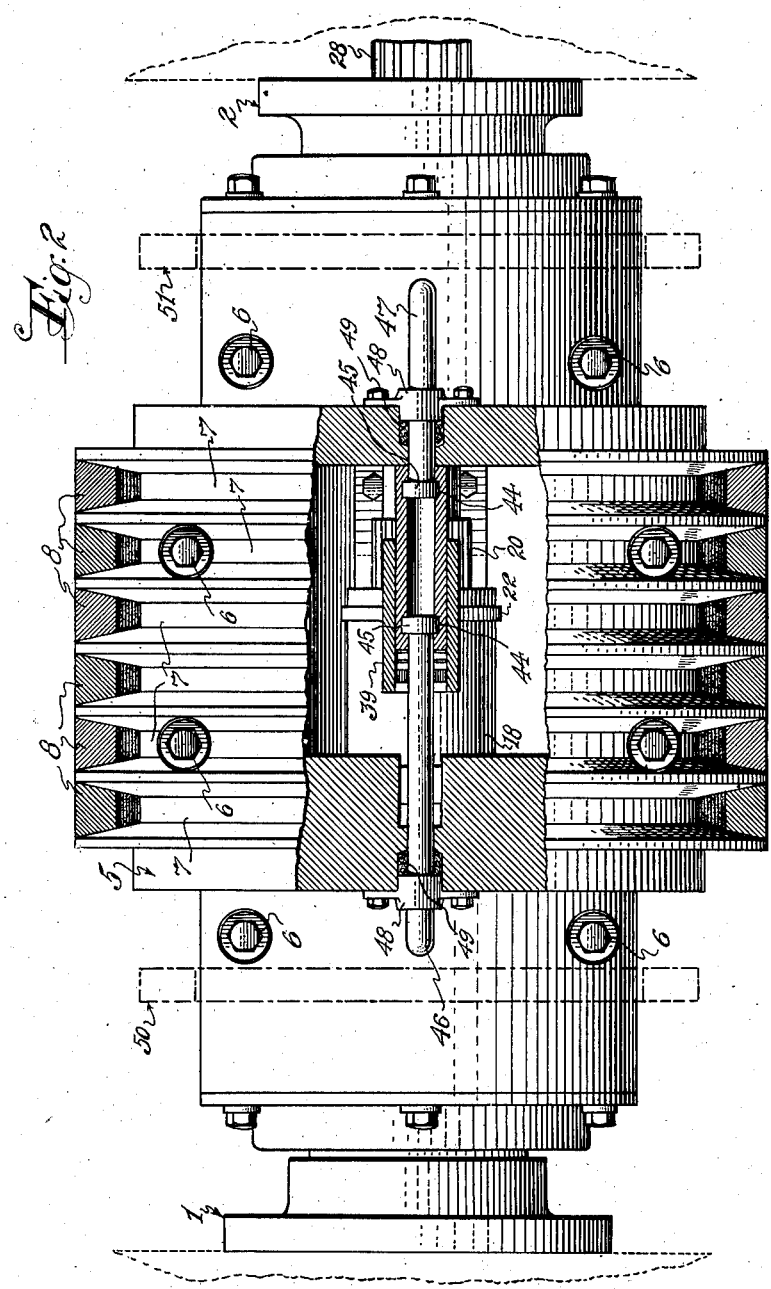

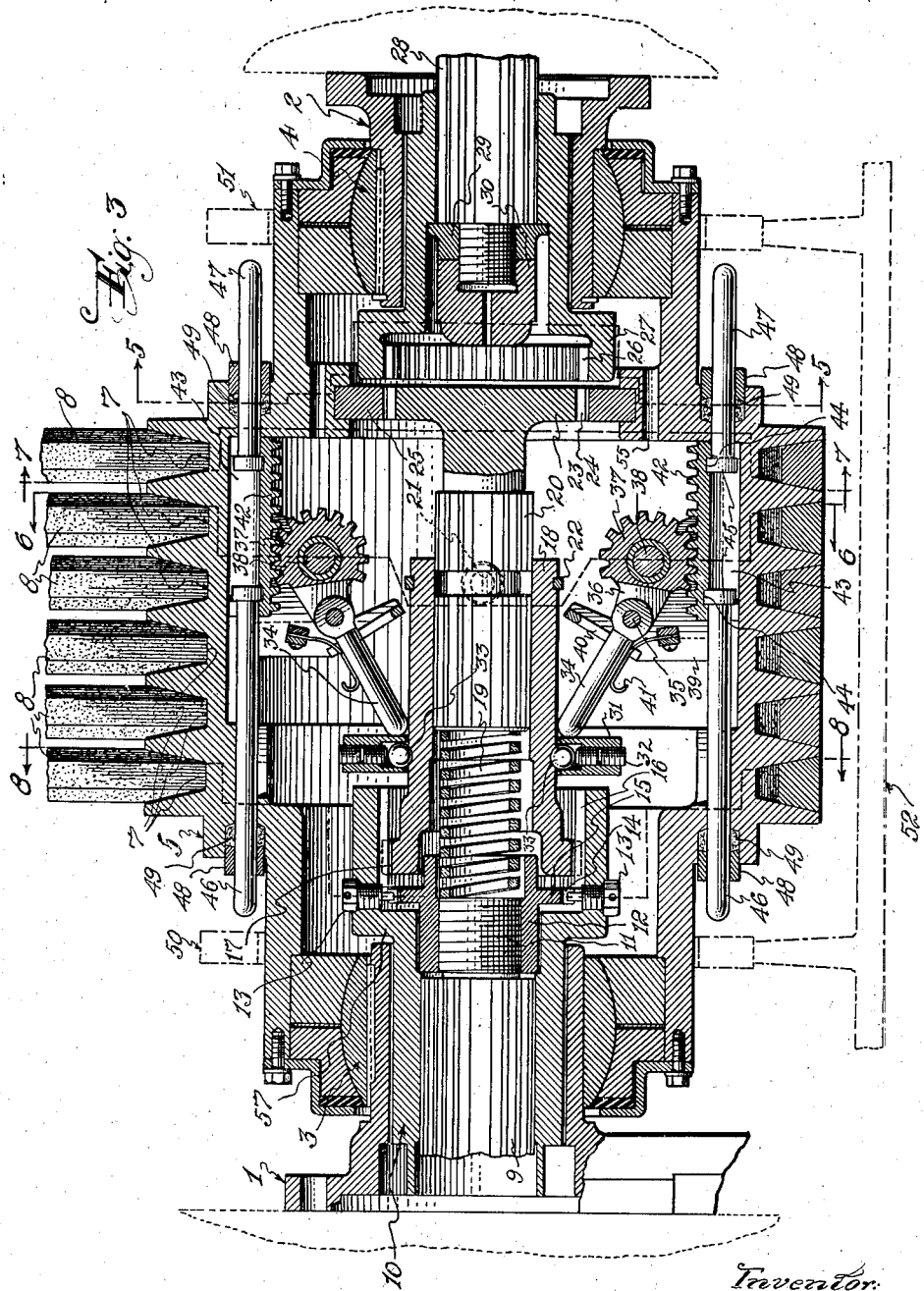

Dec. 11, 1945.  K. W. COUSE  2,390,513
POWER TAKE-OFF STRUCTURE
Filed March 28, 1944  7 Sheets-Sheet 5
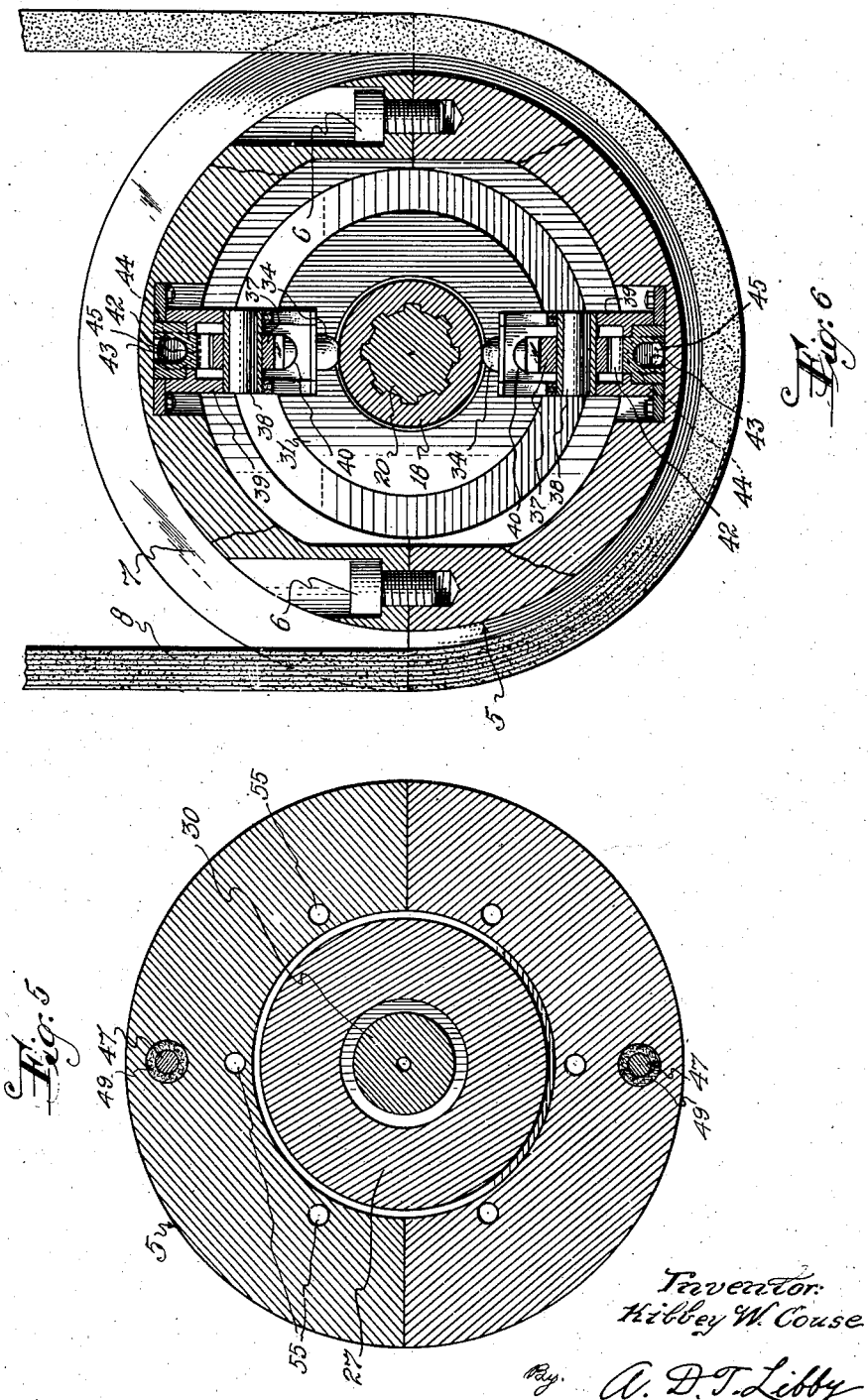

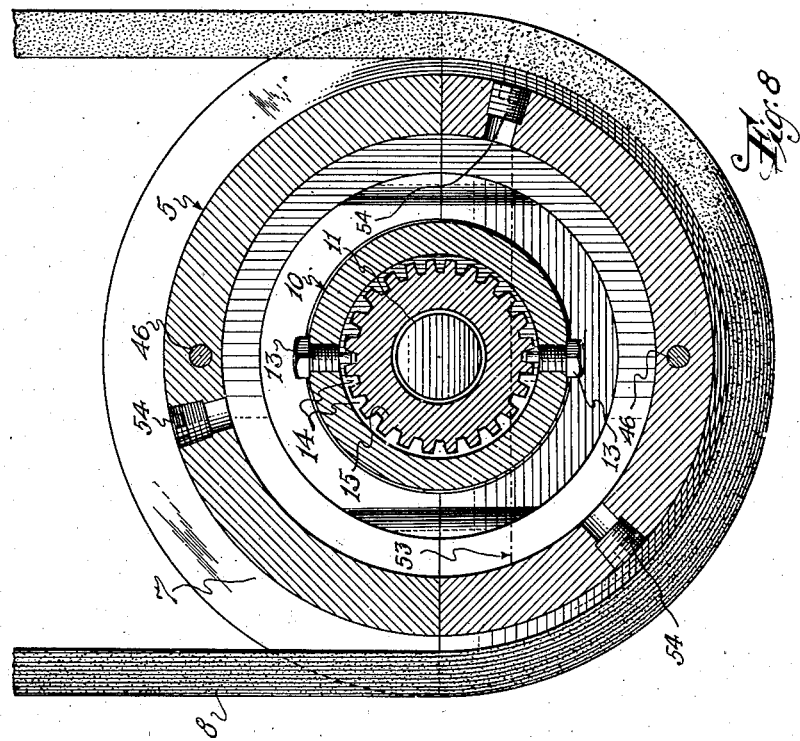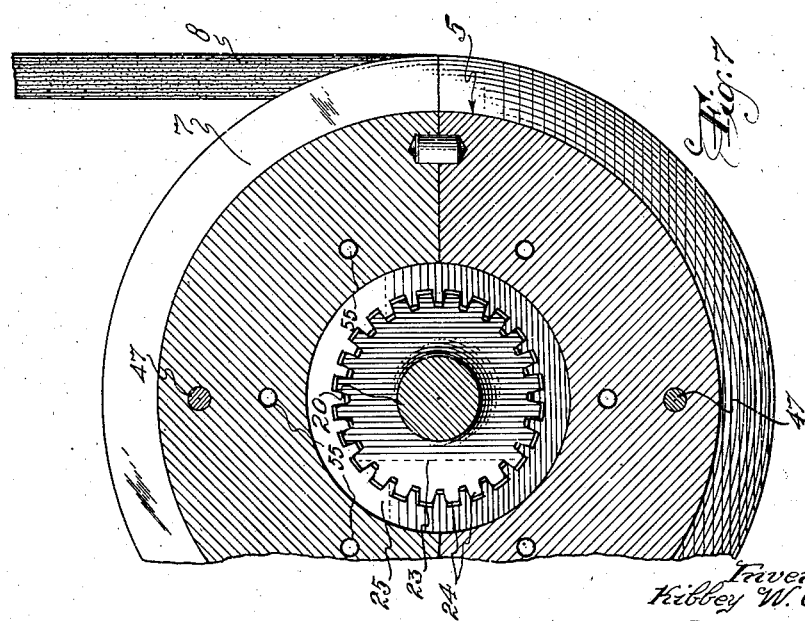

Dec. 11, 1945. K. W. COUSE 2,390,513
POWER TAKE-OFF STRUCTURE
Filed March 28, 1944   7 Sheets—Sheet 7

Inventor.
Kibbey W. Couse.
By A. D. T. Libby
Attorney.

Patented Dec. 11, 1945

2,390,513

UNITED STATES PATENT OFFICE 2,390,513

POWER TAKE-OFF STRUCTURE

Kibbey W. Couse, Newark, N. J.

Application March 28, 1944, Serial No. 528,393

11 Claims. (Cl. 74—11)

This invention relates to a power take-off particularly adapted for use with heavy moving vehicles such as army trucks, tanks and traveling machine shops of the type shown in my Design Patent D-109,942, issued May 31, 1938. Such vehicles, especially the traveling machine shop which carries different kinds of machine tools such as a grinder, shaper, lathe, drill press, milling machine, welding machine and other apparatus, all of which are essential to making repairs in the field on all types of war equipment, it is necessary to switch the engine of the vehicle from the differential drive shaft to one or more of the machine tools referred to, or to a shaft from which such machines may take their power.

It is therefore the primary object of my present invention to provide a suitable power take-off which can be used to transfer the power drive from the vehicle engine or from some other source of power to some machine required to be driven.

A further object is to provide a power take-off so constructed that when used on a traveling vehicle, it cannot be used to operate the machines on the vehicle while the vehicle is traveling under its own power.

Further objects will appear to one skilled in this art by reference to the following specification, taken in connection with the attached drawings, wherein:

Figure 1 is a side elevation of the complete power take-off structure, some of the parts being broken away to show in part how the casing is held together.

Figure 2 is a top plan view of Figure 1 with parts broken away to show certain details of the shift rods used with the structure.

Figure 3 is a vertical sectional view of the structure shown in Figure 1.

Figure 4 is a horizontal view of Figure 1 with one-half of the casing removed.

Figure 5 is a section on the line 5—5 of Figure 3.

Figure 6 is a section on the line 6—6 of Figure 3.

Figure 7 is a section on the line 7—7 of Figure 3.

Figure 8 is a section on the line 8—8 of Figure 3.

Figure 9:
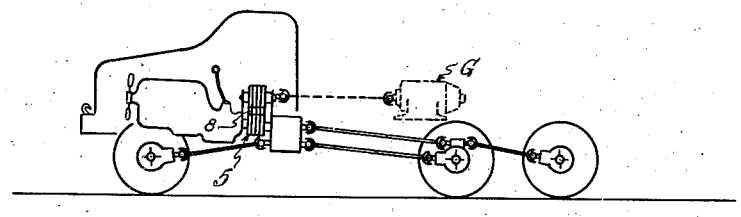
Figure 9 is a schematic view showing the application of the power take-off to a certain type of truck having both front and double rear drives.
Figure 10:
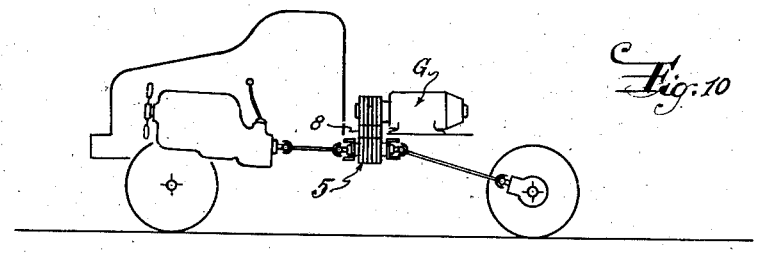
Figure 10 is a view similar to Figure 9 but of a different type of vehicle.
Figure 11:
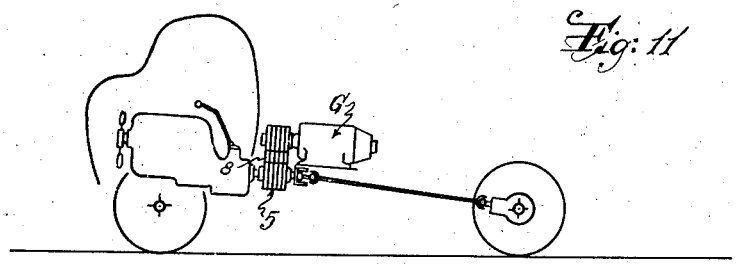
Figure 11 is a view similar to Figure 10, but of a still further type of vehicle.

In Figures 9, 10 and 11, the power take-off is shown as adapted to be connected to a generator which may be used for various purposes.

In the various views, wherein like numbers refer to corresponding parts, 1 is a support member for the drive end of the structure, while 2 is a support member for the driven end of the structure. The support members 1 and 2 carry between them, on suitable bearings 3 and 4, a casing 5 which is shown as being made in two parts held together by a plurality of screws 6.

The outer cylindrical surface of the casing 5 is provided with a plurality of annular V-shaped portions 7, between which there are adapted to be operated a plurality of belts 8 forming a drive connection between the power take-off structure and some machine to be driven, such as a generator G shown in Figures 9, 10 and 11.

Coming through the drive support member, is a drive shaft 9 drivingly carrying, as by splines, a member 10, both extending inwardly toward the interior of the casing. The member 10 has an annular flange 51 which is in close proximity to the inner end of the support member 1 to prevent the member 10 from moving to the left.

The inner end of the shaft 9 is threaded at 11 to take a collar 12 which is threaded onto the shaft 9 until it abuts against the shoulder on the member 10 where it is securely held by means of screws 13 carried by the member 10. The inner ends of the screws project into notches 14 in a flange 15 formed on the collar 12. The inner periphery of the inner end of the member 10 has clutch teeth 16 to slidingly receive clutch teeth 17 on the end of a sleeve 18. Positioned in the end of the collar 12 and extending within the sleeve 18, is a heavy spring 19. This spring abuts against the end of a splined stud 20 that extends a substantial distance within the sleeve 18.

The stud 20 is fastened to the sleeve 18 in any satisfactory manner as by a plurality of lock screw studs 21 which are held in place by a split snap ring 22 seated in a groove in the end of the sleeve 18 and passing over the heads of the screws 21. The stud 20 has a flange 23, the periphery of which is provided with clutch teeth 24 which are adapted to engage corresponding clutch teeth in a member 25 fastened to the casing 5. The clutch teeth of the flange 23, as shown in Figure 3, are in engagement with clutch teeth on the member 25, but the sleeve 18 and stud 20 are adapted to be moved to the right as will be later explained, so that the clutch teeth 24 will engage clutch teeth 26 on a member 27 carried on the driven shaft 28.

The member 27 is held to the shaft 28 by splines and also by a nut 29 and lock nut 30, both of which engage the screw threads on the end of the shaft 28. It will be noted that the lock nut 30 has a rounded end to act as a stop member for the flange 23 when it is moved into driving engagement with the member 27.

Mounted on the sleeve 18, is an annular abutment 31, the same being held in place by screws 32, each of which engages or positions a ball 33 located in a seat in the sleeve 18. As shown in Figure 3, the screw 32 may be in two parts so that the inner part is locked in position by the outer part. I prefer this type of abutment to one that is fixed to the sleeve as it will have a slight movement to give freedom of action to a pair of pins 34, each of which is pivotally mounted at 35 to its projection 36 forming part of its cooperating pinion 37. Each of the pinions 37 is operatively carried on a stub shaft 38 held in a support member 39 that in turn is fastened to the casing 5 in any satisfactory manner. The pin 34 passes through an opening 40 in a part of the support member 39 which also carries a spring 41 which engages the pin 34 to cause it to follow the annular abutment and sleeve as the sleeve is moved.

The pinion 37 meshes with a rack 42 slidable on the inner peripheral wall of the casing 5 and, as shown in Figure 3, which illustrates one position of operation, abuts against the end wall of the casing. As shown in Figure 6, the rack 42 has a longitudinal recess 43 and grooves 44 formed therein near its opposite ends to receive the heads 45 of rods 46 and 47 which extend through a gland 48 and a packing 49 preferably of self-lubricating material. The rods 46 and 47 are adapted to be engaged, respectively, by annular rings 50 and 51 slidably carried on the casing 5 and adapted to be actuated by any suitable means as by a shift bar 52.

Coming now to the operation of the structure, it will be seen from Figure 3, as heretofore referred to, that the drive shaft 9, through the drive member 10, is operatively connected to the sleeve 18 and that in turn to the stud 20, and through its flange 23 with the member 25 fastened to the casing 5. Through the medium of this connection, power is delivered from the engine to the drive shaft 9 and to the casing 5 which drives the belts 8 connected to the machine to be operated, such as the generator G of Figures 9, 10 and 11. When it is desired to drive the vehicle, force is applied to the shift bar 52 and the ring 51 to cause the same to engage the two rods 47 diametrically positioned in the casing 5. These rods will be moved to the left as shown in Figure 3, thereby forcing the racks 42 to the left into abutting relation with the opposite side walls of the casing 5. This will turn the pinions 37 and tend to withdraw the pins 34 from the abutment 31, but the spring 19 immediately moves the sleeve 18 and the stud 20 to the right, causing the ends of the pins 34 to maintain their dual contact between the abutment 31 and the peripheral wall of the sleeve 18, the pins 34 being aided in following this movement of the sleeve by their respective springs 41 and the freedom of movement in the holes 40 in the support member 39. Thus the spring 19 causes the flange 23, with its clutch 24, to move into engagement with the clutch teeth 26 of the driven member 27, whereby the power from the drive shaft 9 is transmitted to the driven member 27 and driven shaft 28.

When it is desired to shift back to the position of Figure 3, the shaft bar 52 is operated so that the ring 50 engages the rods 46 which will move the racks 42 back to the position shown in Figure 3. Likewise, the pinion 37 and rod 34 are moved back to this position, where it will be noted that the center line of the pin 34, when passing through its pivotal center, will pass below the axis of the pinion 37, thereby providing an effective locking action between the pinion and its rack and holding the parts securely in position as shown in Figure 3.

It may be mentioned in passing that the interior of the take-off structure may carry considerable oil as indicated by the broken oil-level line 53 (see Figure 8). A plurality of plugs 54, three being shown, are used for passing oil into the interior of the casing, and this oil is transferred to various parts of the apparatus by various oil holes, some of which are indicated at 55 (see Figure 7), and an oil hole 56 in the nut 30 whereby the thrust bearing of the nut against the flange 23 is provided with considerable lubrication.

It will be seen, from what has been said, that certain of the details may be varied without departing from the spirit of my invention or the scope of the appended claims.

What I claim is:

1. A power take-off structure including a casing having an outer surface adapted to receive means for transmitting power from the casing, support means carrying bearings for each end of the casing, a driving shaft projecting through the support means at one end of the casing toward the interior of the casing and operatively carrying a member having clutch teeth, a driven shaft projecting through the support means at the other end of the casing toward the interior thereof and operatively carrying on the end a member having clutch teeth, a sleeve extending inwardly of the casing in alignment with the driving shaft and having clutch teeth slidably meshing with the clutch teeth on said member carried by the driving shaft, a stud having one end entering the sleeve with means for operatively fastening the stud and sleeve together, the other end of the stud terminating in a flange adjacent the clutch teeth of said member on the driven shaft, the flange having clutch teeth thereon, a member fixed to the casing and having clutch teeth, means within the casing for shifting the sleeve and stud to cause said clutch teeth on the flange to engage either the clutch teeth on the member carried by the driven shaft or the clutch teeth of the member carried by the casing, said means within the casing having parts extending outside the casing, and means for acting on said extending parts for causing the power shift substantially as described.

2. A power take-off structure as set forth in claim 1, further defined in that part of the means within the casing for shifting the sleeve and stud comprises a spring having at least a part of it housed within the sleeve, and having its ends in engagement with the driving shaft and said stud for moving the stud in one direction to cause the clutch teeth on the flange to engage the clutch teeth on the member carried by the driven shaft.

3. A power take-off structure as set forth in claim 1, further defined in that part of the means within the casing for shifting the sleeve and stud comprises an annular abutment fixed to the outer part of the sleeve, a pair of racks and pinions disposed within the casing on opposite sides of the sleeve and stud, the pinions having pins extending into engagement with said abutment, the racks carrying said parts which extend outside the casing whereby the means acting on one pair of said parts will move said sleeve and stud so as to cause the clutch teeth on the stud flange to engage the clutch teeth on the member fastened to the casing.

4. A power take-off structure as set forth in claim 1, further defined in that part of the means within the casing for shifting the sleeve and stud comprises an annular abutment fixed to the outer part of the sleeve, a pair of racks and pinions disposed within the casing on opposite sides of the sleeve and stud, the pinions having pins pivotally attached to parts of the pinions and extending into contact with the abutment at its junction with the sleeve, each rack carrying a pair of rods, one at each end, which protrude from opposite ends of the casing and which constitute said extending parts whereby the means acting on one pair of said parts will move said sleeve and stud so as to cause the clutch teeth on the stud flange to engage the clutch teeth on the member fastened to the casing.

5. A power take-off structure as set forth in claim 1, further defined in that part of the means within the casing for shifting the sleeve and stud comprises a collar attached to the inner end of the driving shaft and having a part extending beyond the end of the shaft, the collar having a flange with notches therein and set screws in the member carried by the driving shaft and having the clutch teeth, the set screws going into the notches in said collar flange, a spring having one end positioned within the extending part of the collar and the other end extending within the sleeve and engaging said stud end for moving the stud in one direction to cause the clutch teeth on the flange to engage the clutch teeth on the member carried by the driven shaft.

6. A power take-off structure as set forth in claim 1, further defined in that the means within the casing for shifting the sleeve and stud comprises a collar attached to the inner end of the driving shaft and having a part extending beyond the end of the shaft, the collar having a flange with notches therein and set screws in the member carried by the driving shaft and having the clutch teeth, the set screws going into the notches in said collar flange, a spring having one end positioned within the extending part of the collar and the other end extending within the sleeve and engaging said stud end for moving the stud in one direction to cause the clutch teeth on the flange to engage the clutch teeth on the member carried by the driven shaft, an annular abutment fixed to the outer part of the sleeve, a pair of racks and pinions disposed within the casing on opposite sides of the sleeve and stud, the pinions having pins extending into engagement with said abutment, the racks carrying said parts which extend outside the casing whereby the means acting on one pair of said parts will move said sleeve and stud so as to cause the clutch teeth on the stud flange to engage the clutch teeth on the member fastened to the casing.

7. A power take-off structure as set forth in claim 1, further defined in that the means within the casing for shifting the sleeve and stud comprises a collar attached to the inner end of the driving shaft and having a part extending beyond the end of the shaft, the collar having a flange with notches therein and set screws in the member carried by the driving shaft and having the clutch teeth, the set screws going into the notches in said collar flange, a spring having one end positioned within the extending part of the collar and the other end extending within the sleeve and engaging said stud end for moving the stud in one direction to cause the clutch teeth on the flange to engage the clutch teeth on the member carried by the driven shaft, an annular abutment fixed to the outer part of the sleeve, a pair of racks and pinions disposed within the casing on opposite sides of the sleeve and stud, the pinions having pins pivotally attached to parts of the pinions and extending into contact with the abutment at its junction with the sleeve, each rack carrying a pair of rods, one at each end, which protrude from opposite ends of the casing and which constitute said extending parts whereby the means acting on one pair of said parts will move said sleeve and stud so as to cause the clutch teeth on the stud flange to engage the clutch teeth on the member fastened to the casing.

8. A power take-off structure including a cylindrical casing rotatably mounted at opposite ends, the casing being adapted to receive power-transmitting means thereon, driving means entering the casing at one end, driven means having clutch teeth entering the casing at the opposite ends and both of said means terminating within the casing, transmission means positioned wholly within and longitudinally movable within the casing, the transmission means including a sleeve operatively connected to a part of the driving means, a stud operatively connected to the sleeve and having a flange with clutch teeth thereon, a member fastened to the casing and having clutch teeth positioned closely adjacent the clutch teeth on a part of the driven means, and means carried by the interior wall of the casing for acting on the exterior part of the sleeve to move it and the stud in one direction, a spring acting between the sleeve and a part of the driving means to move the sleeve and stud in the opposite direction, and means carried by the casing for acting on the transmission means to cause the stud flange to engage the driven member or the casing member as desired.

9. A power take-off structure including a cylindrical casing rotatably mounted at opposite ends, the casing being adapted to receive power-transmitting means thereon, driving means entering the casing at one end, driven means having clutch teeth entering the casing at the opposite ends and both of said means terminating within the casing, transmission means positioned wholly within and longitudinally movable within the casing, the transmission means including a sleeve and an interconnected stud, all in axial alignment with the driving and driven means, the sleeve being operatively connected at one end to the driving means, while the stud has a flange adapted to be operatively connected to the casing or to the driven means, shiftable devices within the casing for acting on the sleeve to move it and the stud to one position of power operation, and a spring coacting with said shiftable devices to move the sleeve and stud into another position of power operation, and means for acting on said shiftable devices to secure the desired power application.

10. A power take-off structure including a cylindrical casing rotatably mounted at opposite ends, the casing being adapted to receive power-transmitting means thereon, driving means entering the casing at one end, driven means having clutch teeth entering the casing at the opposite ends and both of said means terminating within the casing, transmission means positioned wholly within and longitudinally movable within the casing, the transmission means including a sleeve and an interconnected stud, all in axial alignment with the driving and driven means, the sleeve being operatively connected at one end to the driving means, while the stud has a flange adapted to be operatively connected to the casing or to the driven means, a pair of racks and pinions within the casing and disposed on diametrically opposite sides of the sleeve and stud, and each pinion having a pin extending into engagement with the sleeve and abutment thereon, and means for moving the racks, pinions and pins to move the sleeve and stud into one position of power operation and to allow shifting of them into another position of power operation, and a spring for completing this latter shift.

11. For use with an automatic vehicle, a power take-off structure for inter-position between the vehicle transmission and its differential, said take-off structure including a casing revolvably mounted and carrying clutch means, driving means entering the casing from the vehicle transmission end and having clutch means at its inner end and driven means leading out of the casing toward the vehicle differential for connection thereto and having clutch means at its inner end, longitudinally movable transmission means located wholly within the casing between the driving and driven means, the transmission means comprising a sleeve and stud anchored together in tandem relationship, the sleeve having clutch means at one end to permanently engage the clutch means on the driving means, while the stud has clutch means to engage the clutch means on the casing or the driven means, and means carried by the casing for shifting the sleeve and stud so the stud engages with either the casing clutch means or the clutch means on the driven means, and a spring acting on the sleeve for completing one of said engagements.

KIBBEY W. COUSE.